United States Patent [19]

Lee

[11] 4,055,366
[45] Oct. 25, 1977

[54] ELEVATING ROOFS

[76] Inventor: David Lee, Northchurch House, Northchurch, England

[21] Appl. No.: 619,627

[22] Filed: Oct. 6, 1975

[30] Foreign Application Priority Data

Oct. 8, 1974 United Kingdom .............. 43465/74

[51] Int. Cl.² ............................................. B60D 3/34
[52] U.S. Cl. ................................ 296/23 G; 135/4 A; 296/26
[58] Field of Search ............. 296/26, 27, 23 R, 23 G, 296/23 C, 31 P; 135/4 A, 5 A, 7.1 A, 1 A

[56] References Cited

U.S. PATENT DOCUMENTS

| 2,276,236 | 3/1942 | Latimer | 296/19 |
| 2,930,051 | 3/1960 | Kampmeier | 296/23 R |
| 2,987,342 | 6/1961 | Meaker | 296/23 C |
| 3,028,609 | 4/1962 | Tolf | 135/1 A |
| 3,456,978 | 7/1969 | Daniels | 296/27 |
| 3,713,687 | 1/1973 | Hooks | 296/26 |
| 3,742,966 | 7/1973 | Franzen | 135/1 A |
| 3,743,345 | 7/1973 | Eckman | 296/27 |
| 3,763,607 | 10/1973 | Glover | 135/1 A |
| 3,770,314 | 11/1973 | Borskey | 296/26 |
| 3,785,693 | 1/1974 | Fulton | 296/27 |
| 3,863,977 | 2/1975 | Hardinge | 296/26 |
| 3,923,334 | 12/1975 | Key | 135/1 A |
| 3,935,353 | 1/1976 | Doerfling | 296/31 P |

Primary Examiner—Joseph F. Peters, Jr.
Assistant Examiner—John A. Carroll
Attorney, Agent, or Firm—Schiller & Pendiscio

[57] ABSTRACT

An elevating roof primarily applicable to vehicles such as caravans and motor caravans is provided of the kind comprising a rigid rectangular roof member hinged along one edge over an opening in the vehicle roof to move between the closed position and an open position in which the other walls of the elevating roof are provided by a foldable fabric material. The invention provides for the foldable material to be shaped and arranged in conjunction with a framework such that the wall opposite the roof member overhangs its corresponding edge of the opening in the vehicle roof. According to an important feature of the invention the framework comprises two generally "U" shape members one of which is mounted in guides and the other having its free ends embracing the limbs of the first mentioned member, the bridges of both members being attached at spaced positions to the fabric wall and the arrangement being such that movement of said other member along the limbs of the first mentioned member in an outward direction causes the bridges of both said members to taughten the fabric wall and retain it in the open position.

9 Claims, 10 Drawing Figures

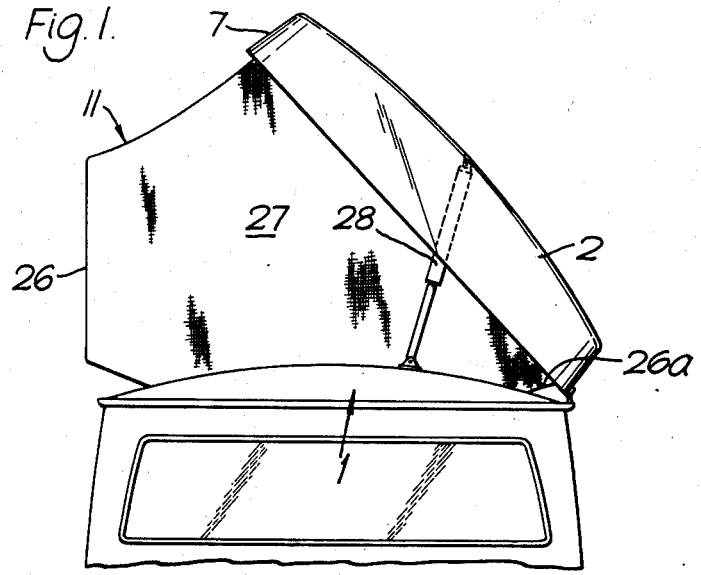
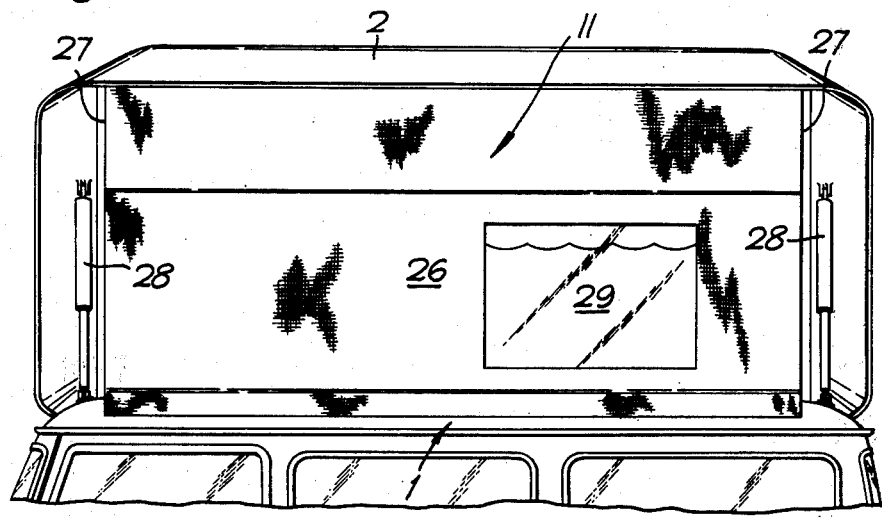

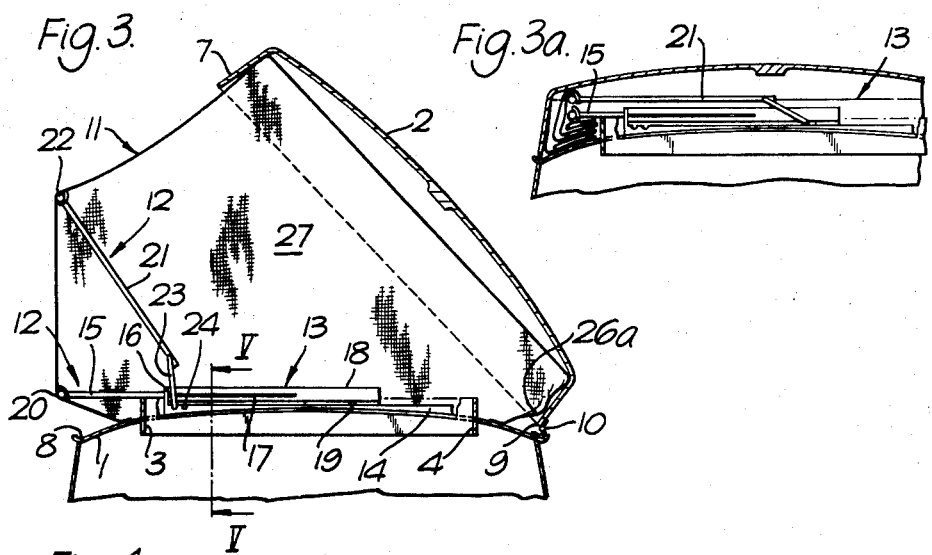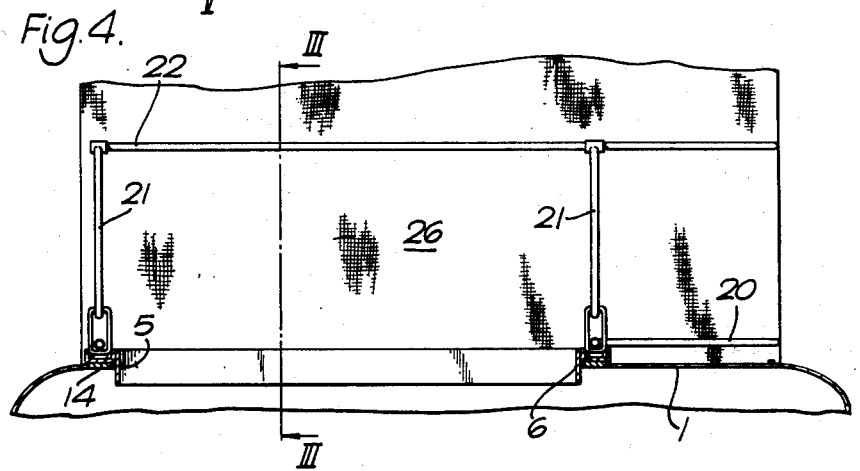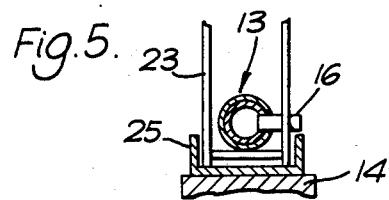

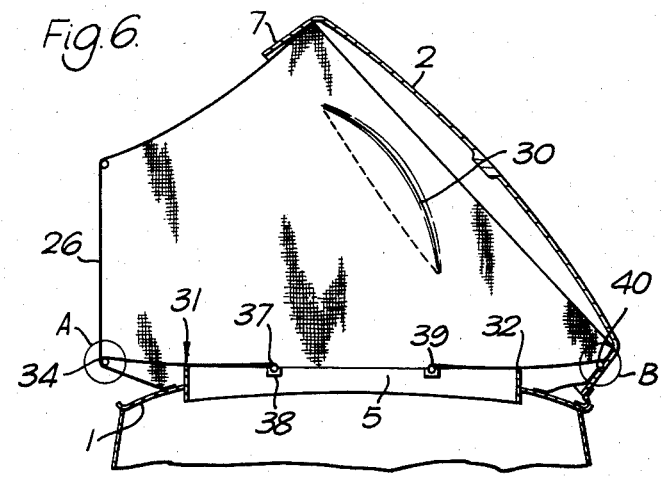
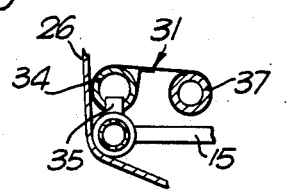
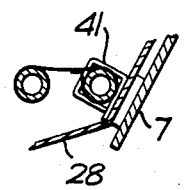
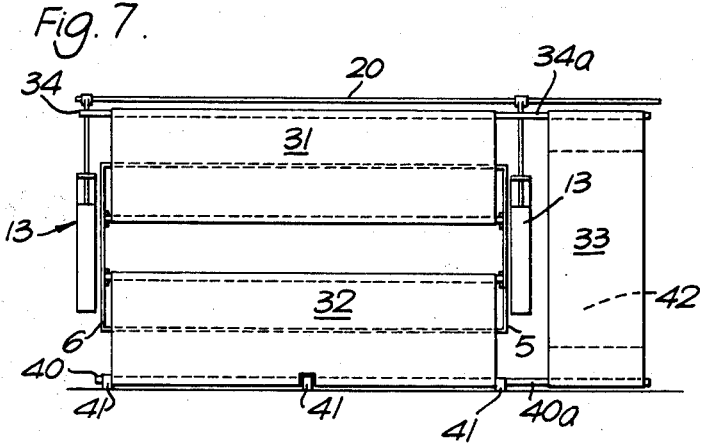

ELEVATING ROOFS

This invention relates to collapsable canopies for providing a temporary covered area for living accommodation and/or storage.

The invention has particular application to collapsable canopies of the kind comprising a rigid substantially rectangular member which is adapted to be hinged along one edge to the base member for movement between a lowered position covering a substantially rectangular area of the base member to a raised position where it provides one wall of the covered area, a foldable material (e.g. a fabric, plastics sheet material, or a plasticised fabric) extending between corresponding edges of the rigid member and rectangular area which, in use, is unfolded in the raised position of the rigid member to provide the other walls of the covered area.

According to one aspect of this invention, in a collapsable canopy of the kind referred to above, the foldable material is shaped and arranged in conjunction with a framework such that, on moving the rigid member to its raised position, the wall provided by the foldable material opposite to the rigid member overhangs its corresponding edge of the rectangular area.

According to a feature of the invention, the framework for the collapsable canopy comprises two generally U-shaped members, the first U-shaped member being supported in a plane above and substantially parallel to the plane of the rectangular area with its free ends mounted in guides or cylinders located adjacent each said transverse edge of said area, and the second U-shaped member having ends which loosely embrace the limbs of the first U-shaped member, the bridges of both U-shaped members being attached to the foldable fabric on said opposite wall thereof at spaced positions, the arrangement being such that when the rigid member is raised by the user from within the canopy area, the frame members are partly moved to operative limit positions, the ends of said second U-shaped member are moved outwardly by the user to engage against abutments provided on the first member, and continued outward movement by the user urges both frame members to their limit positions where they support the said opposite wall in a position overhanging its corresponding edge of the rectangular area.

According to another feature of this invention, the canopy is of greater dimensions than the area it is to cover and one or more telescopic arms, each having a cylinder containing a pressurized fluid, are provided and are adapted for fitting between the rigid member and the base member at positions outside the canopy area, the arms being of a kind not requiring manual adjustment whereby the user can raise or lower the canopy from within the canopy area.

One form of collapsable canopy to which the invention may be advantageously applied is elevating roofs for attachment to cars, vans, estate cars or other vehicles to provide additional headroom as required. Particularly in the case of vehicles intended to provide the facility of overnight accommodation, such an elevating roof also creates space in which one or more folding berths can be accommodated. However, a disadvantage with known forms of elevating roof is that the area over which elevation is obtained is restricted by the width of vehicle on which the roof is mounted and, in length, by the length of the roof opening due to the need for the user to reach support arms for the roof, whereby the roof can be manually secured in its raised condition and released therefrom. This restriction in both width and length limits the amount of headroom and area for accommodating sleeping berths particularly in the case where the base vehicle is of relatively small dimensions.

A collapsable canopy in accordance with the invention can reduce this disadvantage significantly.

Thus, in accordance with another aspect of this invention a van, car, estate car, or other vehicle is provided with a roof opening and an elevating roof is mounted over said opening and comprises a collapsable canopy according to first aspect of this invention, the roof opening constituting the rectangular area described in said first and second aspects.

In order that the invention may be readily understood and further features made apparent, one embodiment thereof as applied to an elevating roof for a motor caravan will now be described, by way of example, with reference to the accompanying drawings in which:

FIG. 1 is an external end view of the roof in its raised condition,

FIG. 2 is an external side view of the roof in its raised condition,

FIG. 3 is an internal end view on the line III—III of FIG. 4 of the roof in this raised condition, FIG. 3a is a fragmentary view similar to FIG. 3 with the roof in its closed condition, FIG. 4 is an internal side view of the roof in its raised condition, FIG. 5 is an enlarged part-sectional view on the line V—V of FIG. 3 of a detail of the roof.

FIG. 6 is a view similar to FIG. 3 showing a bed conversion,

FIGS. 6A and 6B are enlarged detail views of the parts referenced A and B in FIG. 6, and FIG. 7 is a plan view of the bed conversion.

Referring to FIGS. 1 and 2, the roof 1 of the motor caravan is provided with a rectangular roof opening which is covered by an elevating roof member 2 which is of significantly larger dimensions than the roof opening as can be seen from FIGS. 3 and 4 wherein the limits of the opening are indicated in respect to its width by facing members 3, 4 (FIG. 3) and in respect of its length by facing members 5, 6 (FIG. 4). In this embodiment, the roof member 2 extends over the entire roof 1 of the motor caravan and is provided with a peripheral wall whereby, in its closed condition, the lower edge of the wall fits within a gutter 8 (see FIG. 3) provided around the periphery of the roof 1. As shown in FIG. 3 one longitudinal lower edge of the wall of the roof member 2 is attached, via a number of hinges 10, to the gutter of its respective edge of the roof 1. The roof member 2 is of a depth sufficient to accommodate the foldable parts of the roof when in the closed condition, the foldable parts comprising a fabric or plastics sheet canopy portion generally referenced 11 and a folding framework 12.

The folding framework 12 includes two frame units, one of which comprises a pair of telescopic members 13 which extend tranversely and which are rigidly attached to the roof 1 via an elongated wooden spacer 14, one behind each facing member 5 and 6 (for the purpose of clarity the facing member 5 is not shown in FIG. 3). The movable arm 15 of each telescopic member is provided with a peg 16 (see FIG. 5) for a purpose described hereinafter and a slot 17 is provided in the stationary part 18 of the telescopic member to accommodate this peg and thereby permit the movable arm to move to a fully retracted position. A closed ended slot 19 is provided between each stationary part 18 and its wooden spacer 14 for a purpose also to be discussed hereinafter. The two telescopic members are connected across the face ends of their movable arms by a bridge in the form of a bar 20 thereby providing a frame unit of generally U-shape; the bar 20 however extends the length of the roof canopy. The second frame unit comprises a pair of arms 21 connected at their outer ends by bar 22 similar to bar 20. At their inner ends, each arm 21 has a metal loop 23 which is angled to the axis of its arm 21 and is of a dimension sufficient to embrace the stationary part 18 of a respective telescopic member 13 but will engage the peg 16 on the movable arm 15. Each loop 23 is free to slide within the slot 19 of its respective member within the limits of the ends of the slot and is engageable in one of a plurality of grooves 24 (see FIG. 3) at the outer end of said slot. Preferably the bearing surface of each slot 19 is provided with a channel member 25 (see FIG. 5) which minimises any twisting effect on the second frame unit.

The foldable roof canopy is preferably of a material known under the trade name PLASTOLENE and comprises a longitudinal wall section 26 which is of rectangular shape and forms the opposite wall to that provided by the roof member when elevated. The canopy also has two end walls 27, which are shaped to conform with the two frame units in the operative elevated position and thereby provide a canopy part which overhangs by a considerable amount its respective margin of the roof opening. The depth of the wall 7 of the roof member 2, together with its spacing from its respective margin of the roof opening, ensures that a further considerable overhang is provided. To seal the gap between the hinged edge of roof member 2 and its respective edge of the roof opening a strip 26A (see FIG. 3) of "PLASTOLENE" is provided.

In the space on either side of the canopy between the end walls 27 of the latter and the transverse edges of the roof member 2 a telescopic arm 28 is provided for supporting the roof in the elevated position. Each telescopic arm is in the form of a piston and cylinder unit, the latter being filled with a fluid, in this embodiment, with a liquid such as nitrogen, under pressure. Thus to close the elevating roof the user must merely exert a force to overcome the pressure of the fluid in the cylinder. Hence, it is unnecessary for the user to provide a manual adjustment to these arms which are consequently sited outside the canopy area.

In operation, to elevate the roof, a suitable catch for the roof member 2 is released and the latter is raised to its elevated position as shown in FIG. 1. The bar 22 of the second frame unit is attached to the folding wall 26 of the canopy and hence, elevation of roof member 2, partly raises the second frame unit. Full elevation of the canopy is then obtained by the user grasping the metal loops 23 and urging them outwardly together. During this movement the loops engage pegs 16 of the telescopic members 13 and hence, continued outward movement, urges both frame units to their operative positions. Both frame units are locked in their operative positions simply by engaging the lower ends of the metal loops in an appropriate pair of grooves 24 in the wooden spacers 14. Lowering of the elevating roof is effected by disengaging the metal loops thereby releasing the arms 15 of the telescopic members, which are caused to move at least partially towards their retracted position by means of tension springs (not shown) located within said members 13; the pegs 16 of members 13 cause simultaneous inward movement of the second frame unit via said metal loops and movement of both frame members to their fully retracted positions can be accomplished manually by the user moving the bar 20 to its fully inward position. When the roof member 2 is relatched the folds of the PLASTOLENE can be neatly tucked into the space between the roof 1 and roof member 2 around the roof opening.

It will be appreciated that the roof member 2 and canopy can be provided with windows such as shown at 29 (see FIG. 2) and can also be provided with air vents. In this embodiment the vents are provided by a suitable mesh material in the form of a gusset let into the canopy and which can be closed by a flap of the canopy defined by a curved zip 30 (see FIG. 6).

Referring now particularly to FIG. 6, with elevating roof raised, the space provided is sufficient to provide two longitudinally extending bunk beds 31, 32, and a transverse bed 33 over the roof of the driving cabin. The longitudinal beds 32, 31 (see FIG. 6) are in the form of stretchers. The outward pole 34 of bed 31 is located on pegs 35 upstanding from the arms 15 of telescopic members 13 (see FIG. 6A) whilst the inner pole 37 can be unrolled and located in a pair of U-shaped brackets 38 on facing members 5 and 6 of the roof opening. The inner pole 39 of bed 32 can be similarly unrolled and mounted, whilst its outer pole 40 is mounted in square section brackets 41 attached to the wall 7 of roof member 2 (see FIG. 6B).

Referring to FIG. 7 the poles 34 and 40 of beds 31, 32 have extensions 34a, 40a over the roof of the driving cabin, which carry the ends of a fabric sheet constituting the bed 33. Thus, as the elevating roof is raised, this sheet is stretched between its pole extensions. Conveniently, the roof of the driving cabin is provided with a foam layer 42 under the major part of the length of the bed 33 to act as a mattress.

In use, after repeated raising and lowering of the roof, it is possible that some stretching of the PLASTOLENE may occur such as to cause some sagging of the canopy when elevated, particularly in respect of the vertical wall section 26. In order to cater for this, or any other looseness of the canopy, the arms 21 may each be in two sections joined together by a sleeve coupling, this coupling having means associated with the sections of the arm 21 whereby the length of said arm can be adjusted. In this way, particularly the wall section 26 can be stretched to reduce any sagging effect.

What I claim is:

1. For use in conjunction with a vehicle including a roof and a substantially rectangular opening in said roof, an elevating roof comprising in combination a rigid substantially rectangular member which is adapted to be hinged along one edge to said roof for movement between a lowered position covering said substantially rectangular opening and a raised position where it provides one wall of a covered area, a foldable material extending between corresponding edges of said rigid member and said substantially rectangular area which, in use, is unfolded in the raised position of said rigid member to provide the other walls of said covered area, a framework comprising first and second generally U-shaped members comprising a pair of movable arms and a bridge member attached to said arms at one end thereof, said first generally U-shaped member being supported in a plane above and substantially parallel to the plane of said rectangular opening with its arm ends opposite its said bridge member mounted in guides located adjacent each said transverse edge of said opening and the ends of said second generally U-shaped member opposite its said bridge member loosely embracing the limbs of said first generally U-shaped member, said foldable material being attached to said bridge members and being shaped and arranged in conjunction with said framework, the arrangement being such that when said rigid member is raised the frame members are substantially simultaneously moved to partial raised positions, whereby the ends of said second generally U-shaped member can be moved outwardly to engage against abutments provided on the first member, and whereby continued outward movement of said second generally U-shaped member urges both frame members to their respective limit positions where they support the said foldable material in a position overhanging the edge of said rectangular opening, such that a region of said elevating roof associated with said covered wall area overhangs said rectangular opening to provide at least for a lower part of the elevated roof an area which is greater in plan than the area of the roof opening.

2. An elevating roof according to claim 1, wherein each of said frame members comprises two sections joined by a coupling which is operative to adjust the length of that frame member and thereby to stretch said foldable material when said roof is in its raised position.

3. An elevating roof according to claim 1, wherein said rigid member is of greater dimensions than the area it is to cover, and one or more telescopic arms, each having a cylinder containing a pressurized fluid, are provided and are adapted for fitting between said rigid member and the vehicle roof at positions outside the opening area, wherein said arms are adapted to adjust automatically to maintain said rigid member and hence the elevating roof in its raised position.

4. An elevating roof according to claim 1, wherein said foldable material is selected from the group consisting of fabric, plastics sheet, and plasticised fabric.

5. An elevating roof according to claim 1, wherein the arm ends of said first generally U-shaped member are each connected to a piston and cylinder unit and said units are mounted adjacent opposite transverse edges of said opening.

6. An elevating roof according to claim 1, wherein said generally rectangular area comprises a rectangular opening in the roof of a motor vehicle, and said elevating roof is mounted over the said roof opening.

7. An elevating roof according to claim 6, wherein said rigid substantially rectangular member is substantially greater in dimension than said roof opening.

8. An elevating roof as according to claim 6, and further including a pair of collapsible beds in the form of stretchers comprising foldable sheet material carried on pole arms, said pole arms being adapted to be mounted in spaced brackets after the elevating roof is raised whereby each of said pair of beds will extend parallel to the long axis of said vehicle.

9. A canopy according to claim 8 and further including a third collapsible bed comprising foldable material supported on the roof of said vehicle with the elevating roof in its raised position, said third bed extending transverse to the long axis of said vehicle.

* * * * *